United States Patent

[11] 3,623,681

| [72] | Inventor | Clifford E. Ashline<br>Atlanta, Ga. |
|---|---|---|
| [21] | Appl. No. | 798,093 |
| [22] | Filed | Feb. 10, 1969 |
| [45] | Patented | Nov. 30, 1971 |
| [73] | Assignee | Res-Q-Mark International Inc. |

[54] AIRCRAFT LOCATION MARKER
7 Claims, 11 Drawing Figs.

[52] U.S. Cl................................................... 244/1 R,
244/138 R
[51] Int. Cl.................................................. B64d 25/20
[50] Field of Search..................................... 244/1, 138, 142

[56] References Cited
UNITED STATES PATENTS

| 2,382,442 | 8/1945 | Rich et al............. | 244/138 |
| 2,565,470 | 8/1951 | Brown................... | 244/138 |
| 2,966,674 | 12/1960 | Clark..................... | 244/138 X |
| 3,141,640 | 7/1964 | Sutliff et al............ | 244/138 |
| 3,465,251 | 9/1969 | Meek et al............. | 244/138 X |

FOREIGN PATENTS

| 1,268,494 | 6/1961 | France................... | 244/1 |

Primary Examiner—Milton Buchler
Assistant Examiner—Jeffrey L. Forman
Attorney—Raymond N. Matson

ABSTRACT: A folded flexible conspicuous signal panel or parachute with apparatus to eject it from an aircraft and unfold it while attached to a tether and to automatically release the panel or parachute from the tether at a predetermined distance from the aircraft after it is unfolded.

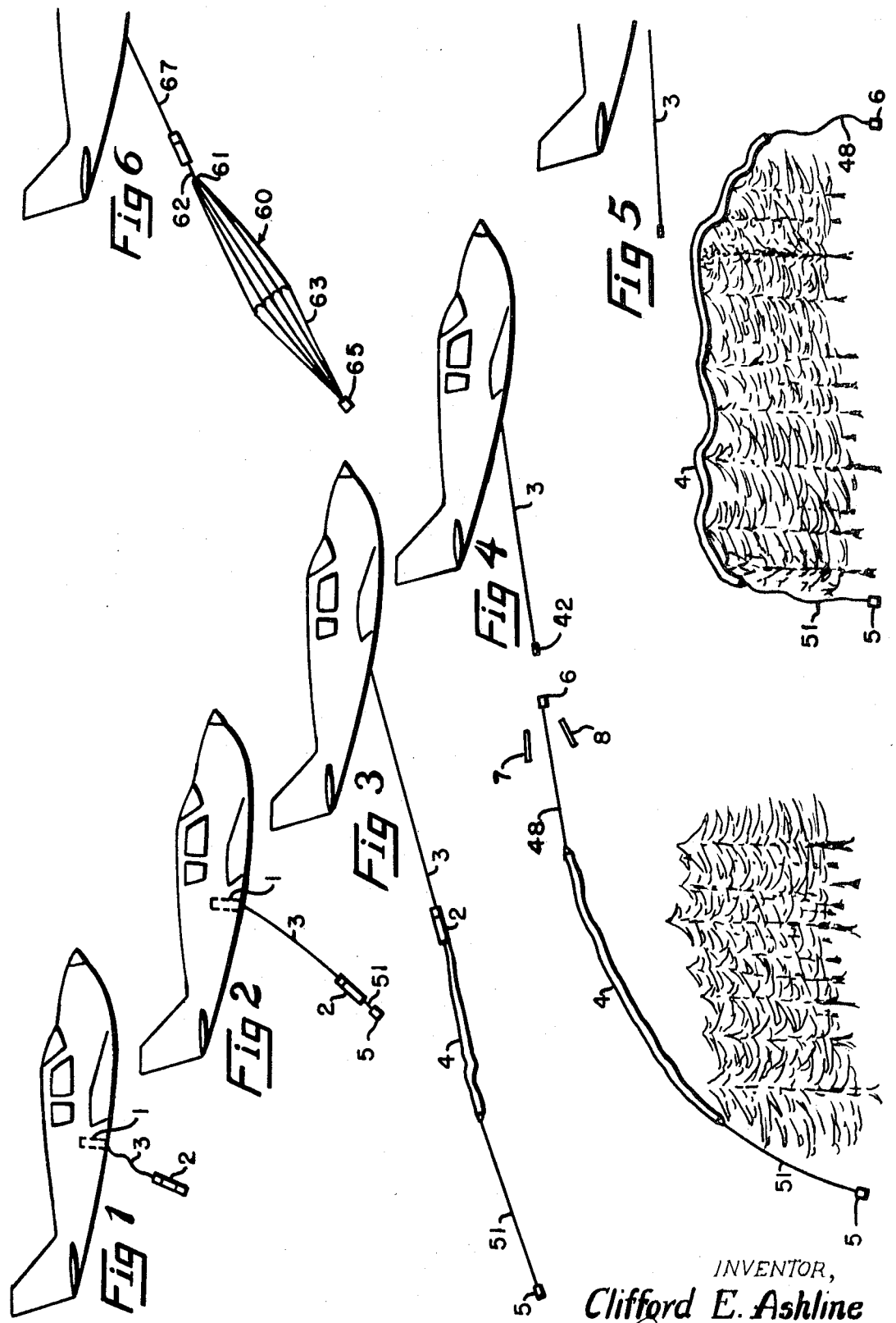

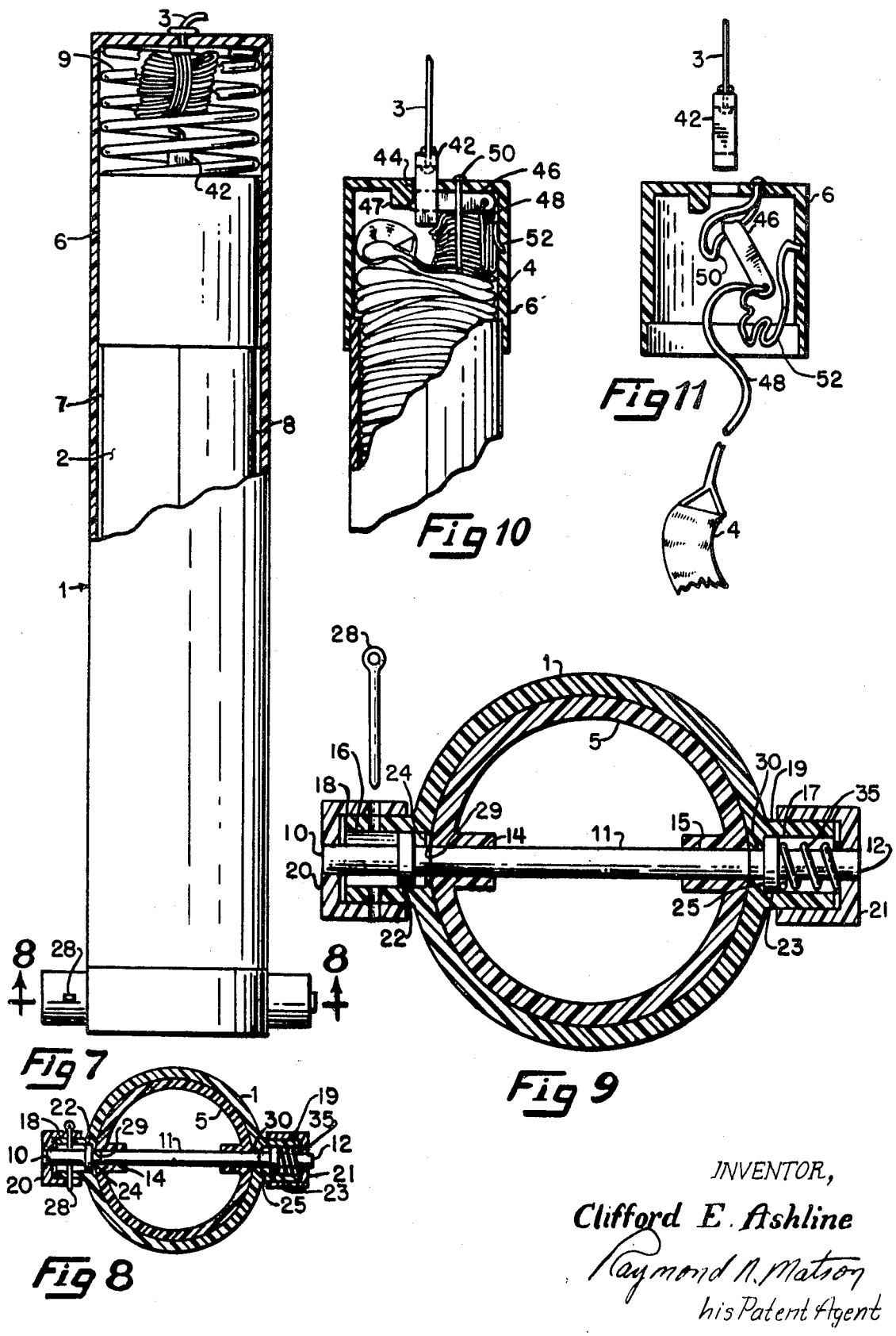

AIRCRAFT LOCATION MARKER

This invention relates to apparatus for use in aircraft to store therein and to release therefrom a flexible visual signal panel or marker for conspicuous display upon the ground to mark a particular location such as at an emergency landing or crash.

Features of the invention can also be used in similar apparatus for controlling deployment of a parachute device released from the aircraft.

It is an object of this invention to provide an economical lightweight apparatus of the above type which can be marketed as a self-contained assembly suitable for simple installation in a variety of aircraft.

Another object of the invention in such apparatus is to eject a compactly folded flexible signal panel structure or marker from an aircraft and automatically effect unfolding of the panel structure only after it has moved a predetermined distance from the aircraft.

Still another object of the invention is to provide apparatus as described above wherein the marker panel structure extends and unfolds while it remains connected to the aircraft and is automatically disconnected from the aircraft only after it is substantially completely extended or unfolded.

The foregoing and other features and objects of the invention will be apparent from the following description of the invention as illustrated in the accompanying drawings.

FIGS. 1 through 5 illustrate sequential positions with respect to an aircraft in flight, of a capsule and a flexible signal panel which unfolds therefrom after ejection of the capsule from the aircraft.

FIG. 6 is a view corresponding to FIG. 4 but illustrating a modification of the invention for use with a parachute.

FIG. 7 is a side elevation of a marker signal apparatus assembly removed from an aircraft and partially cut away to show some interior features.

FIG. 8 is a section on line 8—8 of FIG. 7.

FIG. 9 is a section corresponding to FIG. 8 but illustrating parts in a different operating position.

FIG. 10 is a longitudinal section through one end cap of an ejected capsule with a tether line attached and with a signal panel still partially folded therein.

FIG. 11 is a section similar to FIG. 10 with the signal panel unfolded from the end cap and the tether line released.

The marker signal deploying and releasing apparatus, shown in detail in FIG. 7 through 11, is shown in an operational sequence in FIGS. 1 through 5. The marker apparatus includes a generally cylindrical elongated container 1 secured by any suitable means to the fuselage of an aircraft. A cylindrical signal capsule 2 to be ejected from container 1 and which is releasably attached to a tether line 3, contains a folded marker panel 4 which is shown unfolding in FIG. 3 and 4.

The capsule 2 comprises end caps 5 and 6 and longitudinally split semicylindrical side portions 7 and 8. Upon ejection from the aircraft the end cap 5 separates from the rest of the capsule 2 and has a line 51 connecting it to one end of the panel 4. The cap 5 moves with lost motion relative to the panel 4 until line 51 is fully extended. The weight of cap 5 and its air resistance as the aircraft continues in flight assist in causing the panel 4 to be pulled by line 51 to unfold from the opened end of the capsule 2. After the folded portion of the panel between the side portions 7 and 8 is withdrawn from the capsule 2, these side portions fall away. Further unfolding of the panel from within cap 6 continues until the extended panel is completely withdrawn and connected to cap 6 only by a line 48 which operates in a manner described hereinafter to release the cap 6 from the tether 3.

In the unreleased condition of the apparatus as seen in FIG. 7, the capsule 2 is locked within the container 1 and holds an ejection spring 9 in compression between end cap 6 and the transverse end wall of the container 1. As seen in FIG. 8 the locking means for the capsule 2 comprises coaxial pins 10, 11 and 12. The center pin 11 is of a length equal to the outer diameter of end cap 5 and is axially slideable within coaxial passages 14 and 15 extending transversely of the cap 5. The pins 10 and 12 of identical shape and size are located within respective compartments 16 and 17 formed by hollow cylindrical projections 18 and 19 integral with container 1 and closed at their outer ends by caps 20 and 21 which have a tight frictional fit with the projections 18 and 19. The caps 20 and 21 are centrally apertured to receive and guide the outer ends of pins 10 and 12.

Pins 10 and 12 have intermediate shoulder portions 22 and 23 engageable with inner end faces 24 and 25 of compartments 16 and 17 to limit the inward movement of the pins toward the center of container 1. As illustrated in FIG. 8, the pins 10, 11 and 12 which abut end to end, are held by a safety key 28 in a displaced position to lock end cap 5 against movement within the launch tube container 1. The pin 10 is held with shoulder 22 against face 24 and with the inner end of the pin projecting through a passage 29 in the sidewall of container 1 into passage 14 in cap 5. Pin 10 displaces center pin 11 to extend into passage 30 in the opposite sidewall of container 1. Pin 11 holds pin 12 displaced against the compressive force of a spring 35 encircling pin 12 between its shoulder 23 and the inner end face of cap 21.

The safety key 28 extends through aligned holes in the pin 10, cylindrical projection 18 and the cap 20. The key 28 may be similarly located through aligned holes in pin 12, projection 19 and cap 21 and in such case an added spring weaker than spring 35 is provided in compartment 16 to bias pin 10 to the right. In both cases the spring 35 provides the principal force to move the pins to release capsule 2 upon withdrawal of key 28. This withdrawal may be effected by any means under control of the aircraft pilot to initiate launching of the capsule by the ejection spring 9.

Within ejection spring 9, there is folded a tether line 3 having one end connected to the container 1 and the other end fastened to a generally rectangular ring 42 which extends into cap 6 through an aperture 44 in the end wall thereof. The ring 42 is locked against withdrawal from the aperture 44 by means of a latch member 46 which passes through the ring 42.

One end of the latch member 46 abuts the inner cylindrical wall of cap 6. The other end of latch member 46 has a flat upper surface supporting a flat inside surface of the ring 42 and extends just beyond the ring against an abutment 47 projecting from the end wall of the cap 6 at one side of the aperture 44. The abutting surfaces of latch member 46 and abutment 47 overlap about one-eighth of an inch and lie in a plane forming an angle of 45° with both the longitudinal axis of the latch member 46 and the cylindrical axis of cap 6.

The latch 46 is designed to be tripped to release ring 42 by pulling its end which abuts the cylindrical wall of cap 6 toward the open end of the cap whereby the resistive force of ring 42 on the other end of the latch creates a force couple tending to pivot the latch clockwise as seen in FIG. 10 to the release position of FIG. 11.

The marker panel 4 is folded with accordionlike folds and placed tightly within capsule 2 but in a manner whereby it can be readily withdrawn fold by fold as the panel is pulled out by wind and gravity acting on the cap 5 and the extended or unfolded portion of the panel itself.

The unfolded portion of the panel 4 pressed between the ends of capsule side portions 7 and 8 within the cap 6 tend to retain these side portions in position within the cap 6. The end of panel 4 which initially lies within the cap 6 is connected to one end of a flexible line 48. The other end of this line 48 is connected to the latch 46. The line 48 is folded and stored within the cap 6 under an elastic band 50 which holds the line with sufficient force to prevent its release from the cap 6 until the panel 4 is fully unfolded. Thereafter the line will be pulled from beneath the band 50 to permit lost motion between panel 4 and cap 6 until the line is fully extended whereupon the line will actuate the latch 46 to release the panel 4 and cap 6 from the ring 42. If desired, a portion of the panel 4 may also be held under band 50. A short line 52 interconnects the end cap 6 and the latch 42 so that the cap will remain attached to the line 48 after release of the ring 42 and serve as a weight to keep the panel 4 spread horizontally while it is being dropped, particularly where it is dropped over dense tree-covered areas. In such a case, the end caps 5 and 6 on the lines 51 and 48 tend to penetrate the foliage and hold the panel 4 in position spread over the treetops.

The panel 4 may be of the order of 100 feet in length and lines 48 and 51 each of the order of 50 feet long. The panel is of sufficient width to be readily visible during aerial reconnaissance. The panel is also preferably of thin metal-impregnated Mylar and red Mylar plastic which is not only durable in all environments but also contrasts conspicuously with all terrain. A large panel can be placed in a capsule a few inches in diameter and about 2 feet long.

The container on tube 1 from which the marker capsule is launched, is oriented to prevent the capsule from contact with the aircraft during ejection. Preferably it is in a vertical position when the aircraft is in normal horizontal flight. In the event the apparatus is used with helicopter aircraft, it is recommended that the tube 1 be disposed so that during normal horizontal flight, the capsule is ejected between horizontal and 45° below horizontal. A cartridge-equipped launch tube is preferably used to launch the capsule from a helicopter by an electrically initiated explosive force.

The modification of the invention shown in FIG. 6 employs a parachute 60 with the apex of its canopy 61 connected to a line 62 corresponding to line 48 of the other embodiment. Shroud lines 63 connect the canopy to a load 65. The load 65 and parachute 60 are dropped from an aircraft with the canopy 61 and shroud lines 63 folded. While the tether line 67, line 62, the canopy 61 and shroud lines 63 are unfolding or extending, the canopy will not deploy because of the forward motion of the aircraft pulling on the apex of the canopy. However, after this unfolding or extending is completed, the tether line 67 will be released in the same manner as in the other embodiment and the parachute will deploy under gravitational force of the load 65. In this embodiment, there is no need for an extra line corresponding to the short line 52 of the other embodiment.

Having described two specific embodiments of the invention, it is understood that other modifications and changes within the scope of the appended claims will be obvious.

I claim:

1. Apparatus including a folded elongated generally rectangular, signal panel structure to be released from an aircraft or the like comprising a holder for said structure adapted to be secured to the aircraft, means for releasably securing said folded structure to said holder, in a stored position, tether means including a tether line for connecting said folded structure to said holder after release of said structure from said stored position, and latch disconnect means actuated upon unfolding of said folded structure after release from said stored position to automatically disconnect said tether means to completely free the structure from said holder.

2. Apparatus according to claim 1 wherein said disconnect means includes a ring member secured to one end of said tether line and a pivotable latch extending through said ring member, means connected to said folded structure for pivotally actuating said latch to release said ring when said structure is unfolded, but preventing such actuation of said latch when said structure is folded.

3. Marker signal apparatus for use in an aircraft or the like comprising a container adapted to be rigidly secured to the aircraft; a signal capsule releasably secured to said holder; means for ejecting said capsule from said container; folded elongated visual signal means carried by said capsule; and means for completely unfolding said signal means to extended signalling position after ejection of said capsule from said container; said unfolding means including tether means connecting said signal means to the aircraft until said signal means is completely extended to signalling position.

4. Marker signal apparatus for use in an aircraft or the like comprising a holder adapted to be secured to the aircraft; a signal capsule releasably secured to said holder; means for ejecting said capsule from said holder; folded visual signal means carried by said capsule; means for unfolding said signal means to a signalling configuration after ejection of said capsule from said holder; and means for releasably securing said capsule to said holder comprising coaxial pins slidable in passages in said capsule and said holder; said pins being slidable in said passages between a first position in which said pins interlock said capsule to said holder and a second position in which said capsule is released from said holder.

5. Apparatus according to claim 4 wherein said coaxial pins number three arranged end to end and wherein in the position in which the capsule is released the center pin is carried entirely by one of said capsule and said holder and the outer two pins are carried entirely by the other of said capsule and said holder.

6. Apparatus for dropping a folded, generally rectangular, signal panel structure from an aircraft or the like; said apparatus including tether means for interconnecting said structure to the aircraft; disconnect latch means forming the connection between said tether means and said structure; said disconnect latch means being mechanically actuated by said panel structure upon its complete unfolding after the panel structure is dropped from the aircraft to automatically disconnect said tether means to completely free the unfolded structure from the aircraft.

7. The invention recited in claim 6; and separate weights connected to the ends of said panel structure to maintain it in a generally horizontal unfolded position as it drops to and on the ground.

* * * * *